(12) United States Patent
Jones

(10) Patent No.: US 7,942,474 B2
(45) Date of Patent: May 17, 2011

(54) VEHICLE HVAC CONTROL PANEL RECEPTACLES AND HVAC CONTROL PANEL ASSEMBLIES

(75) Inventor: Earnee Yasha Jones, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/576,720

(22) Filed: Oct. 9, 2009

(65) Prior Publication Data

US 2011/0084509 A1   Apr. 14, 2011

(51) Int. Cl.
*B60R 13/02* (2006.01)
*G12B 9/00* (2006.01)
*B60K 37/00* (2006.01)

(52) U.S. Cl. ............ 296/214; 296/70; 180/90; 248/27.3

(58) Field of Classification Search ................... 296/214, 296/70; 180/90; 248/27.1, 27.3
See application file for complete search history.

(56) References Cited

U.S. PATENT DOCUMENTS

| | | | |
|---|---|---|---|
| 3,779,483 A | 12/1973 | Inoue | |
| 4,124,267 A | 11/1978 | Mines et al. | |
| 4,208,558 A * | 6/1980 | Alsch | 200/296 |
| 4,398,073 A | 8/1983 | Botz et al. | |
| 4,947,010 A | 8/1990 | Heydner et al. | |
| 6,158,802 A | 12/2000 | Akagi et al. | |
| 6,210,217 B1 | 4/2001 | Ping | |
| 6,227,500 B1 | 5/2001 | Inaba et al. | |
| 6,398,041 B1 | 6/2002 | Abbott | |
| 6,513,959 B2 * | 2/2003 | Serizawa et al. | 362/490 |
| 6,600,118 B2 * | 7/2003 | Altmann | 200/295 |

* cited by examiner

*Primary Examiner* — Dennis H Pedder
(74) *Attorney, Agent, or Firm* — Dinsmore & Shohl LLP

(57) ABSTRACT

A receptacle for receiving an HVAC control panel of a vehicle includes a frame and at least one unlocking lever. The frame may define an opening for receiving the HVAC control panel. The at least one unlocking lever may include a handle portion, a shoulder and a tapered portion. The tapered portion pivotally connects the at least one unlocking lever to an underside of the frame while the handle portion may extend from the tapered portion such that, when the handle portion is actuated, the at least one unlocking lever may be elastically flexible with respect to the frame. The shoulder portion is disposed on the at least one unlocking lever between the handle portion and the tapered portion and is operable to engage and retain the HVAC control panel in the frame when the HVAC control panel is inserted into the frame.

20 Claims, 9 Drawing Sheets

VEHICLE HVAC CONTROL PANEL RECEPTACLES AND HVAC CONTROL PANEL ASSEMBLIES

TECHNICAL FIELD

The present invention generally relates to HVAC controls for vehicles and, more specifically, to receptacles for retaining HVAC controls in a headliner of a vehicle.

BACKGROUND

Vehicles may include heating, ventilation and air conditioning (HVAC) controls disposed in an HVAC panel or similar housing which may be positioned on the interior of the roof of the vehicle. Specifically, the HVAC panel holding the HVAC controls may be positioned in a receptacle disposed in the headliner of the vehicle. The receptacle obscures the mechanical and electrical connections of the HVAC controls while allowing a user to access the various control levers and/or buttons which operate the HVAC system from the interior of the vehicle. The HVAC panel may be retained in the receptacle using clips or similar fastening mechanisms. The clips which retain the HVAC panel in the receptacle are often disposed on the interior of the receptacle so that the clips are not visible from the interior of the vehicle thereby improving the aesthetic appearance of the HVAC panel, HVAC controls and the receptacle.

In the event that the HVAC controls must be repaired or replaced, the HVAC controls must first be removed from the receptacle. Because the clips retaining the HVAC panel in the receptacle are located on the interior of the receptacle, the HVAC panel may only be released from the receptacle by accessing the rear of the receptacle and using a tool to release the clips from the HVAC panel. To gain access to the rear of the receptacle, a portion of the headliner must be detached from the roof of the vehicle. However, even with a portion of the headliner detached from the roof of the vehicle, there is very little clearance between the roof of the vehicle and the headliner which makes maneuvering the tool used to release the clips difficult and time consuming. The added difficulty in removing the HVAC panel during repair or replacement of the HVAC controls may add to the cost of servicing the vehicle.

Accordingly, a need exists for alternative receptacles for retaining vehicle HVAC controls in the headliner of the vehicle.

SUMMARY

In one embodiment, a receptacle for receiving an HVAC control panel of a vehicle includes a frame and at least one unlocking lever. The frame may define an opening for receiving the HVAC control panel. The at least one unlocking lever may include a handle portion, a shoulder and a tapered portion. The tapered portion pivotally connects the at least one unlocking lever to an underside of the frame while the handle portion may extend from the tapered portion such that, when the handle portion is actuated, the at least one unlocking lever may be elastically flexible with respect to the frame. The shoulder portion is disposed on the at least one unlocking lever between the handle portion and the tapered portion and is operable to engage and retain the HVAC control panel in the frame when the HVAC control panel is inserted into the frame.

In another embodiment, an HVAC control panel assembly for a headliner of a vehicle may include an HVAC control panel removably inserted in a receptacle. The receptacle may include a frame for receiving the HVAC control panel and at least one unlocking lever flexibly connected to an underside of the frame. The at least one unlocking lever may include a handle portion and a shoulder for releasably engaging the HVAC control panel in the frame. Actuation of the handle portion may elastically flex the unlocking lever with respect to the frame and disengage the HVAC control panel from the receptacle. The HVAC control panel may include a control enclosure, a panel surface positioned on the control enclosure and at least one locking lug disposed on the control enclosure. When the HVAC control panel is inserted in the receptacle the at least one locking lug is engaged with the shoulder of the at least one unlocking lever.

In yet another embodiment, a vehicle may include a headliner with an HVAC control panel assembly disposed therein. The HVAC control panel assembly may include a receptacle and an HVAC control panel removably inserted in the receptacle. The receptacle may be positioned in an opening in the headliner and comprises a frame for receiving the HVAC control panel and at least one unlocking lever. The at least one unlocking lever may include a handle portion extending from a tapered portion and a shoulder for releasably engaging the HVAC control panel in the frame. The unlocking lever may be flexibly connected to the underside of the frame at the tapered portion such that actuation of the handle portion elastically flexes the unlocking lever with respect to the frame and disengages the HVAC control panel from the receptacle. The HVAC control panel may include a control enclosure, a panel surface positioned on the control enclosure and at least one locking lug disposed on the control enclosure, wherein, when the HVAC control panel is inserted in the receptacle, the headliner is disposed between the HVAC control panel and the receptacle and the at least one locking lug is engaged with the shoulder of the at least one unlocking lever.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 5A:
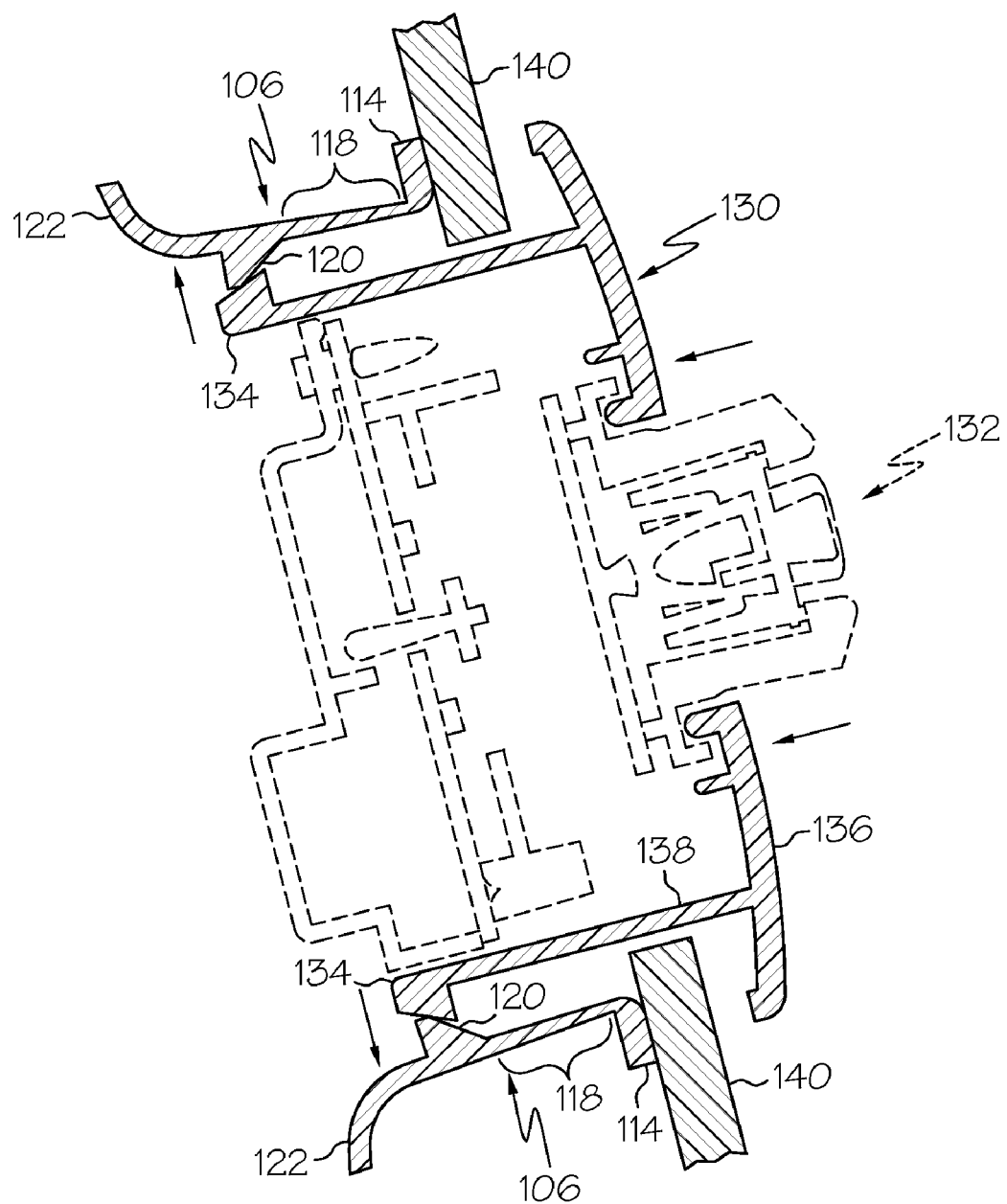
FIG. 5A depicts a cross section of the HVAC panel assembly of FIG. 4 with the HVAC control panel being inserted in the receptacle according to one or more embodiments shown and described herein.
Figure 5B:
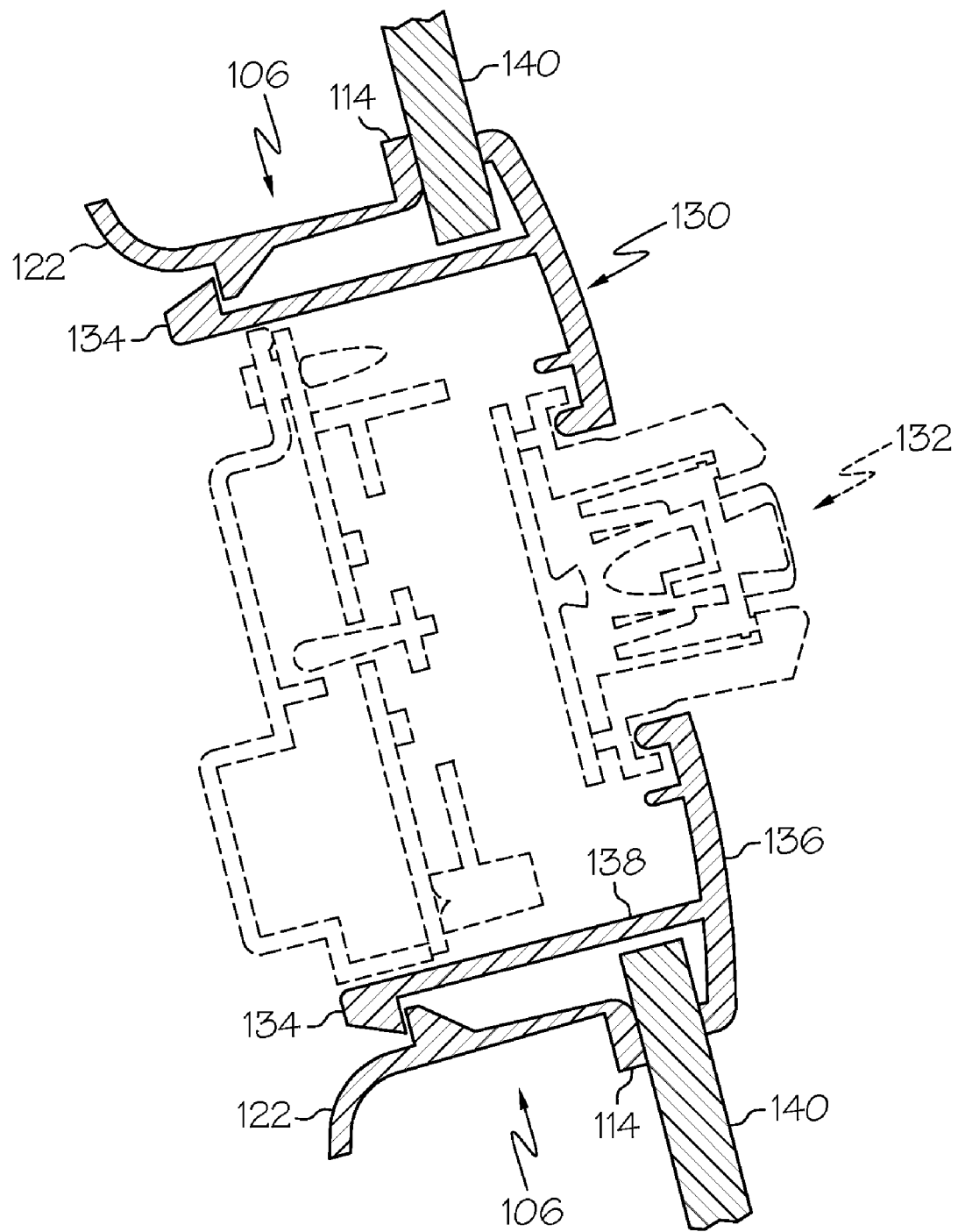
FIG. 5B depicts a cross section of the HVAC panel assembly of FIG. 4 with the HVAC control panel installed in the receptacle according to one or more embodiments shown and described herein.

FIG. 5B depicts a cross section of an HVAC panel assembly according to one or more embodiments shown and described herein. The HVAC panel assembly may generally comprise a receptacle defining an opening in which an HVAC control panel may be inserted. The receptacle may comprise one or more unlocking levers which engage with one or more locking lugs disposed on a body of the HVAC control panel thereby securing the HVAC control panel in the receptacle. The unlocking levers may comprise a handle portion which, when actuated, disengages the receptacle from the HVAC control panel. The HVAC panel assembly and the various components of the HVAC panel assembly will be described in more detail herein.

Figure 1:
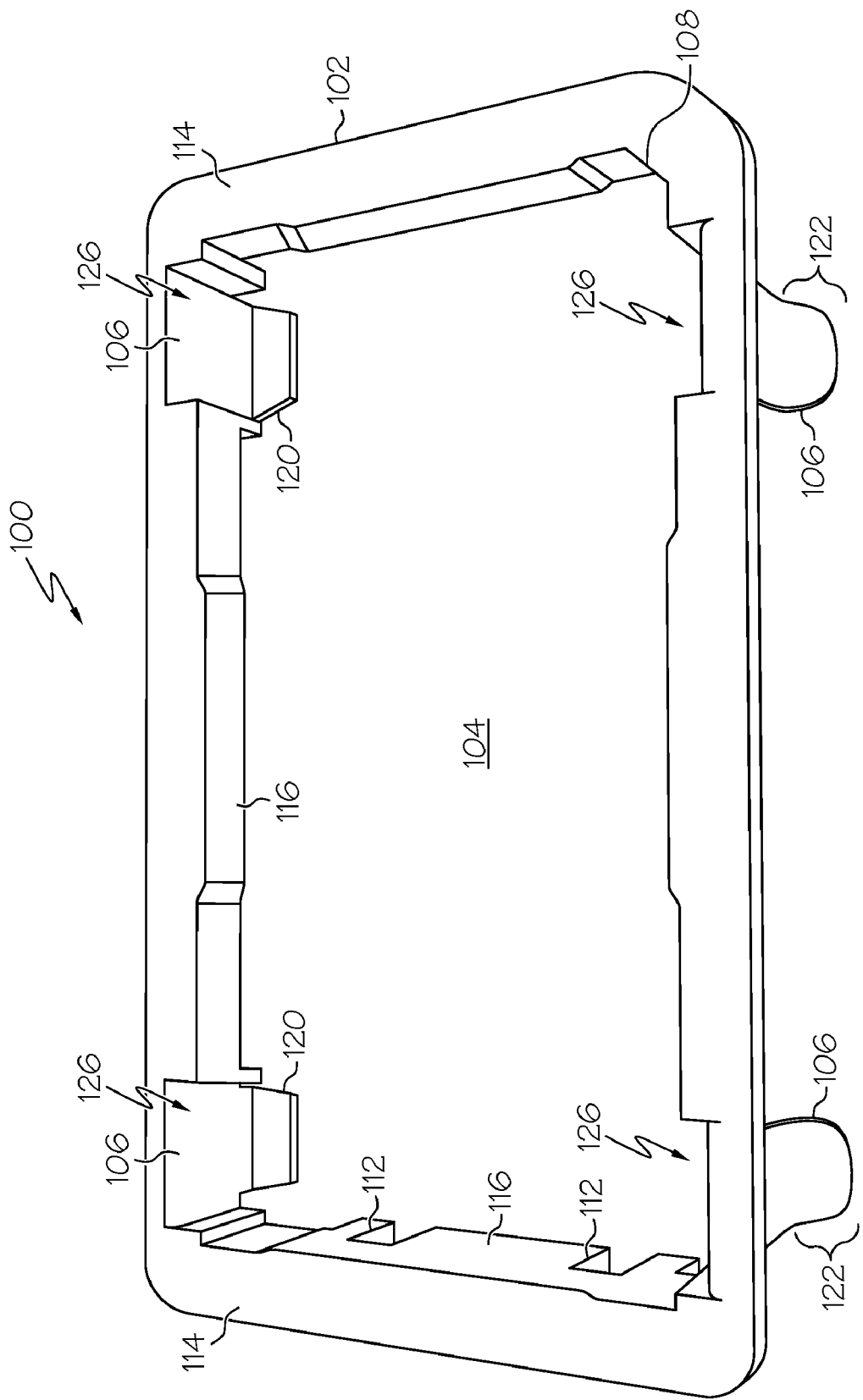
FIG. 1 depicts the front side of a receptacle for receiving an HVAC control panel according to one or more embodiments shown and described herein.
Figure 2:
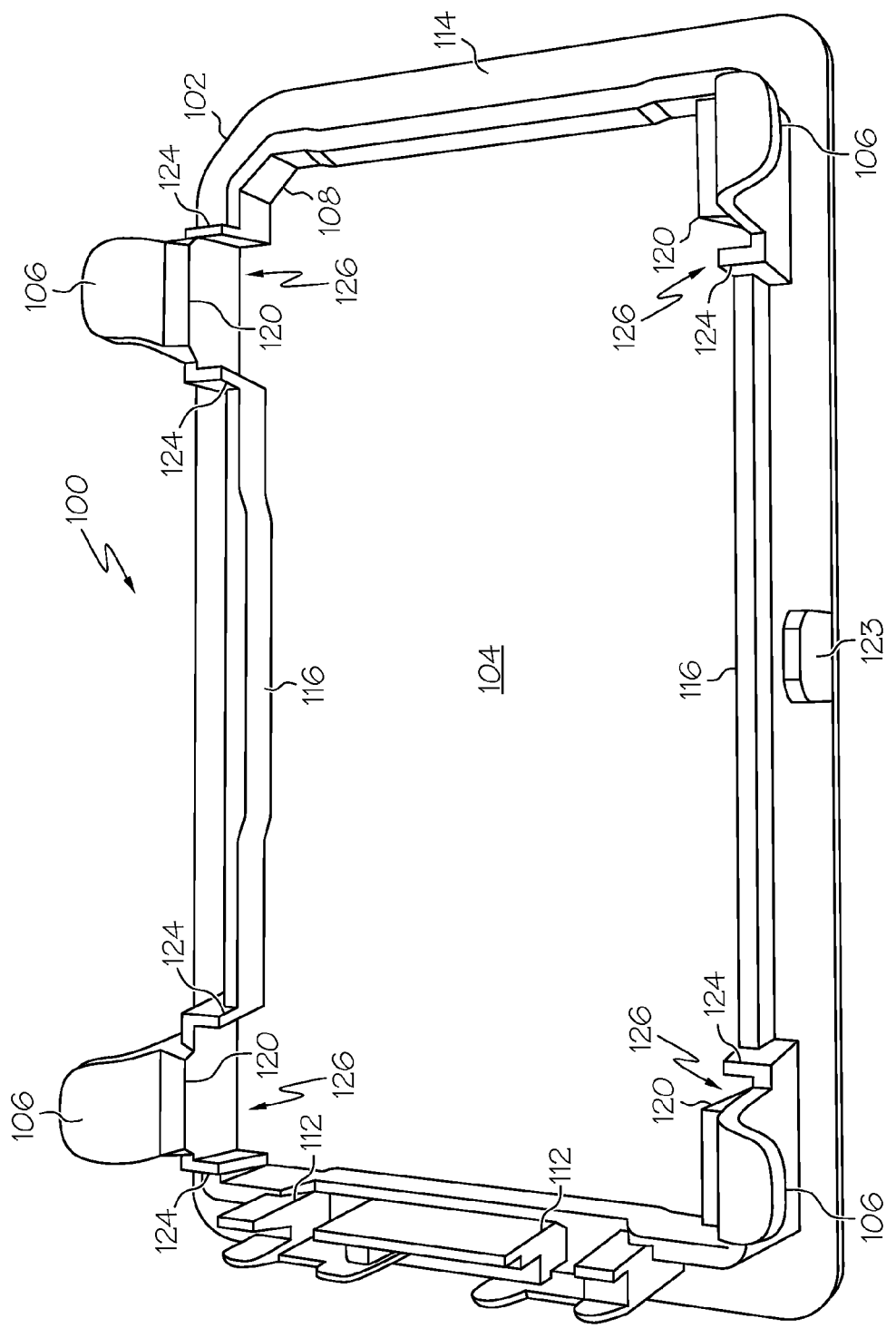
FIG. 2 depicts the backside of the receptacle for receiving an HVAC control panel shown in FIG. 1 according to one or more embodiments shown and described herein.

Referring now to FIGS. 1 and 2, a receptacle 100 of an HVAC panel assembly is depicted from the front side and the backside, respectively. The receptacle 100 may comprise a polymeric material, such as ABS, polypropylene, or a similar polymeric material. The receptacle 100 may be formed by injection molding or any other suitable method for forming polymeric materials. While specific reference is made herein to forming the receptacle 100 from a polymeric material, it should be understood that the receptacle 100 may be constructed from metallic or composite materials or various combinations of metals and polymers and/or composite materials.

In the embodiments shown in FIGS. 1 and 2, the receptacle 100 comprises a frame 102 which generally defines an opening 104 for receiving an HVAC control panel (discussed further herein). The opening 104 may be substantially rectangular in shape, as depicted in FIGS. 1 and 2, such that the opening is suitable for receiving an HVAC control panel having a substantially rectangular configuration. However, it will be understood that the frame 102 and, more specifically, the opening 104 in the frame 102, may have various other geometrical configurations depending on the geometrical configuration of the HVAC control panel which may be disposed in the receptacle.

In one embodiment, the frame 102 comprises a sidewall 116 and a flanged portion 114. The sidewall 116 and the flanged portion 114 may be oriented such that the sidewall 116 and the flanged portion 114 are substantially perpendicular to one another. In one embodiment, the sidewall 116 and the flanged portion 114 may be integral with one another, such as when the receptacle 100 is injection molded as single piece. In another embodiment, the sidewall 116 and the flanged portion 114 may be formed separately and thereafter joined together, such as with adhesives, welding or similar joining techniques, to form the receptacle 100.

In the embodiment shown in FIGS. 1 and 2, the flanged portion 114 and the sidewall portion 116 are formed with an chamfered interior corner 108 directly adjacent the opening 104. The chamfered interior corner 108 may assist in the installation of an HVAC control panel in the receptacle 100 and, more specifically, may prevent the HVAC control panel from being improperly installed in the receptacle.

Still referring to FIGS. 1 and 2, the frame 102 of the receptacle 100 may be formed with additional features. For example, the sidewall 116 of the receptacle may comprise one or more harness connectors 112 to accommodate a wiring harness (not shown) which may be attached to the HVAC control panel when the HVAC control panel is positioned in the receptacle 100. In the embodiments shown herein, the flanged portion 114 of the sidewall 116 may comprise a tab 123 which extends from the underside of the flanged portion 114. The tab 123. The tab 123 may be used to orient the receptacle 100 when the receptacle is positioned in the headliner of a vehicle. However, it should be understood that the receptacle 100 may be formed without the tab 123.

While embodiments of the frame 102 of the receptacle 100 are shown and described herein as comprising a sidewall 116 and a flanged portion 114 it should be understood that the frame 102 may have alternative configurations. For example, in one embodiment (not shown) the frame may comprise a sidewall without a flanged portion while, in another embodiment (not shown), the frame 102 may comprise a flanged portion without a sidewall.

Still referring to FIGS. 1 and 2, the frame 102 of the receptacle 100 may comprise one or more unlocking levers 106 which extend from the backside of the frame 102. In the embodiment shown, the receptacle 100 comprises four unlocking levers. However, it will be understood that the receptacle 100 may comprise any number of unlocking levers 106 including one unlocking lever or more than four unlocking levers. In one embodiment, the unlocking levers 106 may be integrally formed with the frame 102, such as when the frame 102 and unlocking levers 106 are injection molded from a polymeric material. In another embodiment, the unlocking levers 106 may be formed separately from the frame 102 and attached to the frame with adhesives, welding and/or fasteners (e.g., screws, nuts and bolts, and the like). In this embodiment the unlocking levers 106 may be formed from a polymeric material, a metal, or a composite material.

In the embodiments of the receptacle 100 shown and described herein, the unlocking levers 106 extend from the underside of the frame 102 and, as such, extend in a direction which is substantially perpendicular to the backside of the receptacle 100. In the embodiments shown in FIGS. 1 and 2, the unlocking levers 106 are offset from the opening 104. More specifically, the frame 102 is formed with a plurality of substantially U-shaped channels 126 which extend from the front side of frame 102, through the flanged portion 114 and through the sidewall 116. The substantially U-shaped channels 126 are oriented such that the opening of the "U" (e.g., the top portion of the "U") opens into the opening 104 defined by the frame 102. The substantially "U" shaped channels 126 are formed from a pair of channel sidewalls 124 with the unlocking lever 106 forming the back or bottom wall of the channel. The substantially U-shaped channels 126 facilitate inserting an HVAC control panel into the opening 104 of the receptacle 100. More specifically, the substantially U-shaped channels 126 allow the locking lugs of the HVAC control panel to pass through the frame 102 of the receptacle 100 without interference.

While the embodiments shown herein are depicted with the unlocking levers 106 being offset from the opening 104 in the frame 102 of the receptacle 100, it should be understood that the unlocking levers 106 may be positioned directly adjacent the opening 104 in the frame 102. More specifically, in other embodiments (not shown) the unlocking levers 106 may extend directly from the sidewall 116 and/or the flanged portion 114 of the frame 102 such that the unlocking levers 106 are directly adjacent the opening 104 in the frame 102.

Figure 5C:
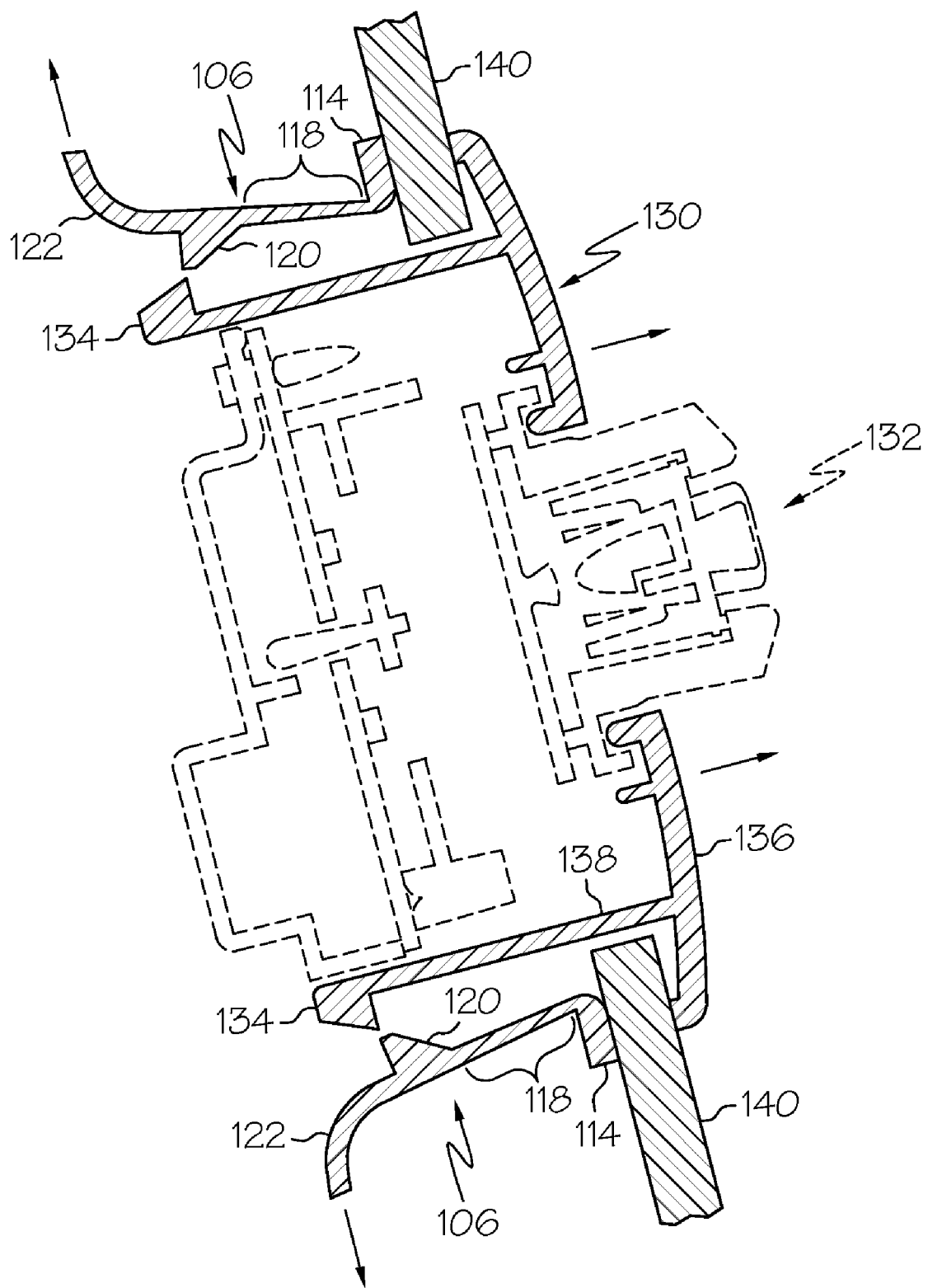
FIG. 5C depicts a cross section of the HVAC panel assembly of FIG. 4 with the HVAC control panel being removed from the receptacle according to one or more embodiments shown and described herein.
Figure 6:
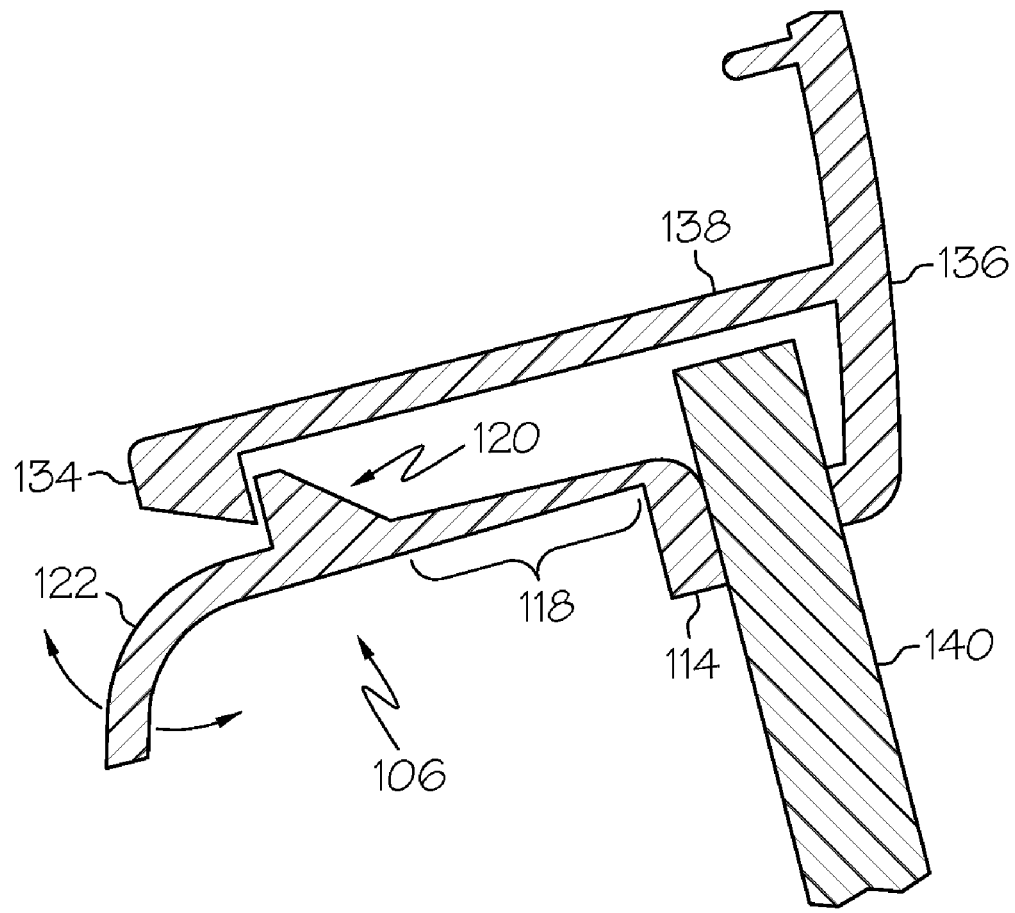
FIG. 6 depicts a close up view of a portion of the cross section of the HVAC panel assembly of FIG. 4 showing the unlocking levers of the receptacle engaged with the locking lugs of the HVAC control panel according to one or more embodiments shown and described herein.

Referring now to FIGS. 1-2 and 5A-6, the unlocking levers 106 may extend from the underside of the flanged portion 114 of the frame 102. For example, the unlocking lever 106 may comprise a tapered portion 118 which connects the unlocking lever 106 to the flanged portion 114. In one embodiment, the unlocking levers 106 are connected to the channel sidewalls 124 of each channel 126 and the underside of the flanged portion 114, as shown in FIGS. 1-2, such that the handle portion 122 and a shoulder 120 of the unlocking lever 106 may elastically flex with respect to the channel 126, the flanged portion 114 and the frame 102. In another embodiment, the unlocking levers 106 extend from the underside of the flanged portion 114 and the entire unlocking lever 106 is operable to elastically flex with respect to the flanged portion 114 as shown in FIGS. 5A-6. In either embodiment, at least a portion of the unlocking lever 106 may taper between the shoulder 120 (described further herein) and the flanged portion 114. This tapered portion 118 allows the unlocking lever 106 to flex with respect to the flanged portion 114 and frame 102.

As described above, the unlocking levers 106 may comprise a handle portion 122 and a shoulder 120. In the embodiments shown and described herein, the shoulder 120 is disposed between the handle portion 122 and the tapered portion 118. As shown in FIGS. 1 and 2, the handle portion 122 extends from the backside of the receptacle 100 and beyond the sidewall 116 of the frame 102 such that the unlocking lever may be elastically actuated (e.g. flexed or pivoted with respect to the frame 102) from the backside of the receptacle. Accordingly, it should be understood that the handle portion 122 of the unlocking levers 106 extend beyond the sidewall 116 and/or flanged portion 114 of the frame 102 such that the unlocking levers 106 may be gripped and actuated without the use of a tool.

In one embodiment, the handle portion 122 may be substantially straight such that the handle portion 122 and unlocking lever 106 are substantially perpendicular to the flanged portion 114 of the frame 102. In another embodiment, as depicted in FIGS. 1-2 and 5A-6, the handle portion 122 may be curved. More specifically, the handle portion 122 of the unlocking lever 106 may be curved away from the opening 104 in the receptacle 100, as depicted in FIGS. 1 and 2. Having the handle portion 122 of the unlocking lever 106 curved facilitates easy access to the unlocking lever 106 from the backside of the receptacle 100 and provides improved actuation of the lever, particularly when the unlocking lever is not visible to an operator actuating the unlocking lever 106, such as when the receptacle 100 is positioned behind a headliner of a vehicle.

As described herein, the unlocking lever 106 may comprise a shoulder 120. The shoulder 120 may be used to engage a corresponding shoulder or locking lug located on the HVAC control panel, as will be described in more detail herein. The shoulder 120 is disposed on the unlocking lever 106 between the handle portion 122 and the tapered portion 118. In one embodiment, the shoulder 120 is disposed on the unlocking lever below the sidewall 116 such that, when the unlocking lever 106 is pivoted of flexed away from the opening 104 of the receptacle 100, the shoulder 120 is moved in a direction away from the opening 104 in the receptacle 100. However, it should be understood that, in other embodiments, the shoulder 120 may be disposed on the unlocking lever 106 closer to the flanged portion 114 (e.g., closer to the front side of the receptacle 100) while still permitting the shoulder to be moved in a direction away from the opening 104 in the receptacle 100 when the unlocking lever 106 is pivoted or flexed away from the opening 104.

In the embodiments shown herein, the shoulder 120 generally comprises a wedge-shaped structure extending from the unlocking lever 106 and into the opening 104 in the receptacle 100. The wedge-shaped structure is narrowest proximate the front side of the receptacle (e.g., proximate the flanged portion 114 in FIG. 6) and increases in width towards the handle portion 122 of the unlocking lever 106.

While specific reference has been made herein to the shoulder 120 of the unlocking lever 106 comprising a wedge-shaped structure, it should be understood that the shoulder 120 may have various other configurations. For example, in other embodiments (not shown) the shoulder may be substantially rectangular, square or hemispherical. Accordingly, it should be understood that the shoulder 120 may have any geometrical configuration for engaging with a corresponding shoulder or locking lug located on an HVAC control panel installed in the receptacle 100 such that the HVAC panel is secured in the receptacle 100.

Figure 3:
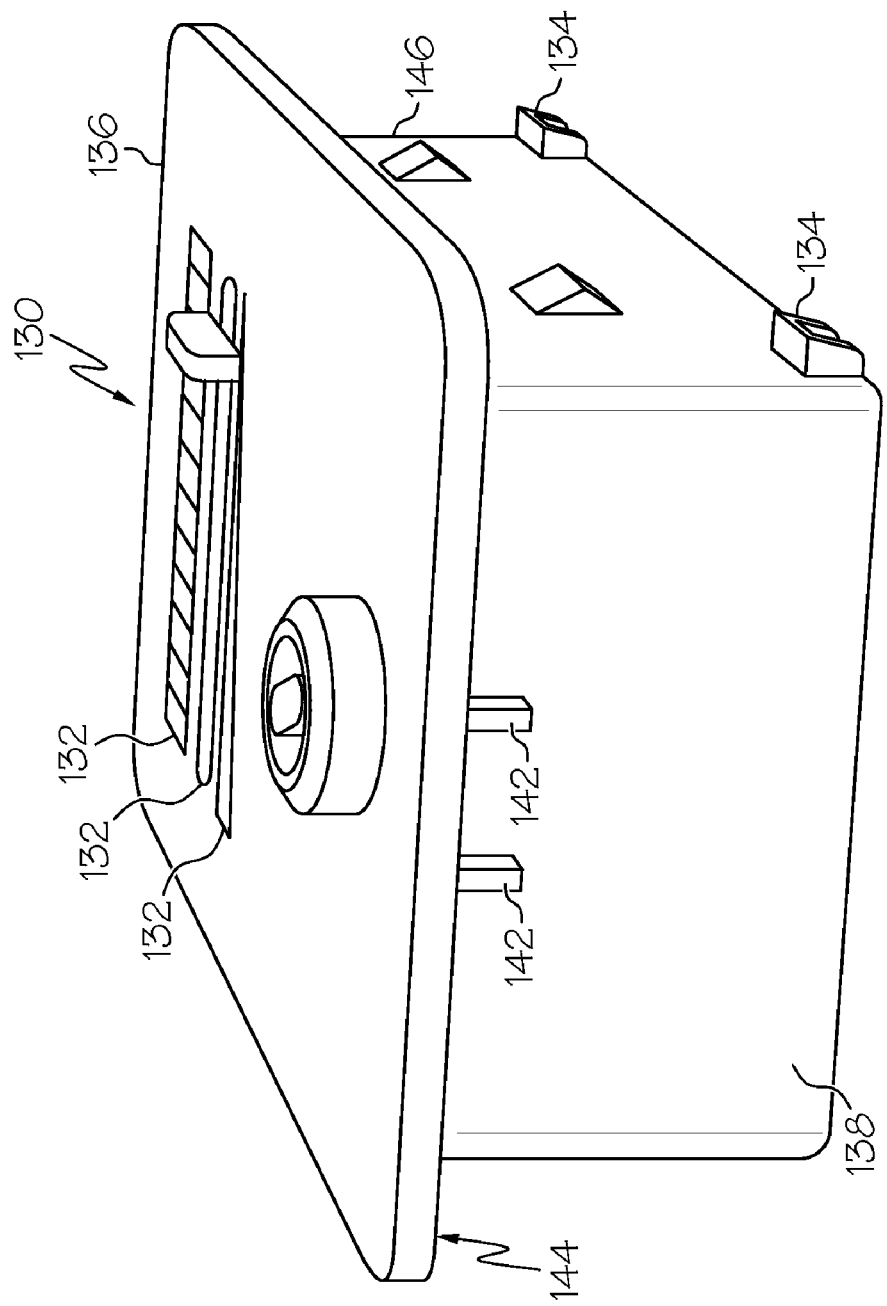
FIG. 3 depicts an HVAC control panel having HVAC controls disposed therein according to one or more embodiments shown and described herein.

Referring now to FIG. 3, one embodiment of an HVAC control panel 130 is shown. The HVAC control panel 130 may be inserted and secured in the receptacle 100 shown in FIGS. 1 and 2. In the embodiment shown in FIG. 3, the HVAC control panel 130 may generally comprise a panel surface 136 and a control enclosure 138. The panel surface 136 and control enclosure 138 may be formed from a polymeric material, metal or combinations thereof. For example, in one embodiment (not shown) the panel surface 136 may comprise an injection molded polymeric material, such as ABS or polypropylene, while the control enclosure 138 may comprise a metallic material, such as steel or aluminum. In this embodiment, the panel surface 136 may be fastened to the control enclosure 138 with fasteners, such as clips, screws of the like.

In another embodiment, as shown in FIG. 3, both the panel surface 136 and the control enclosure 138 are formed from a polymeric material, such as ABS or polypropylene. In this embodiment, the panel surface 136 and the control enclosure 138 may be separately formed, such as by injection molding or the like, and attached together with adhesives, welding and/or fasteners, such as screws or clips. Alternatively, the panel surface 136 and the control enclosure 138 may be integrally formed with one another. For example, the panel surface 136 and the control enclosure 138 may be integrally formed in a single injection molding process.

Figure 7A:
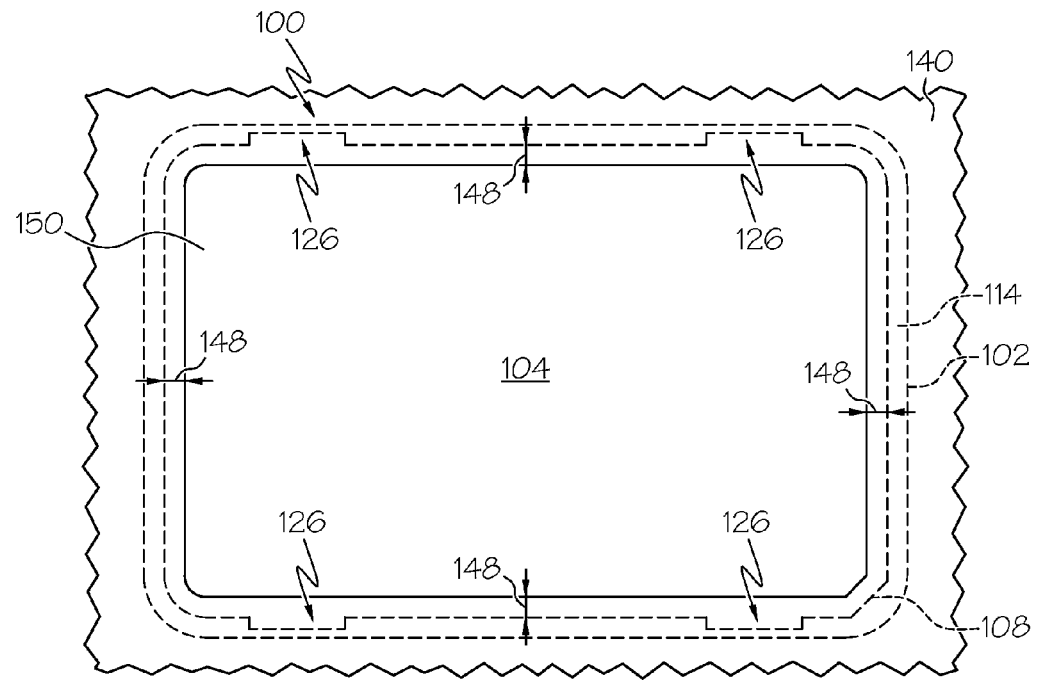
FIG. 7A depicts a receptacle for receiving an HVAC control panel disposed behind a headliner of a vehicle according to one or more embodiments shown and described herein.
Figure 7B:
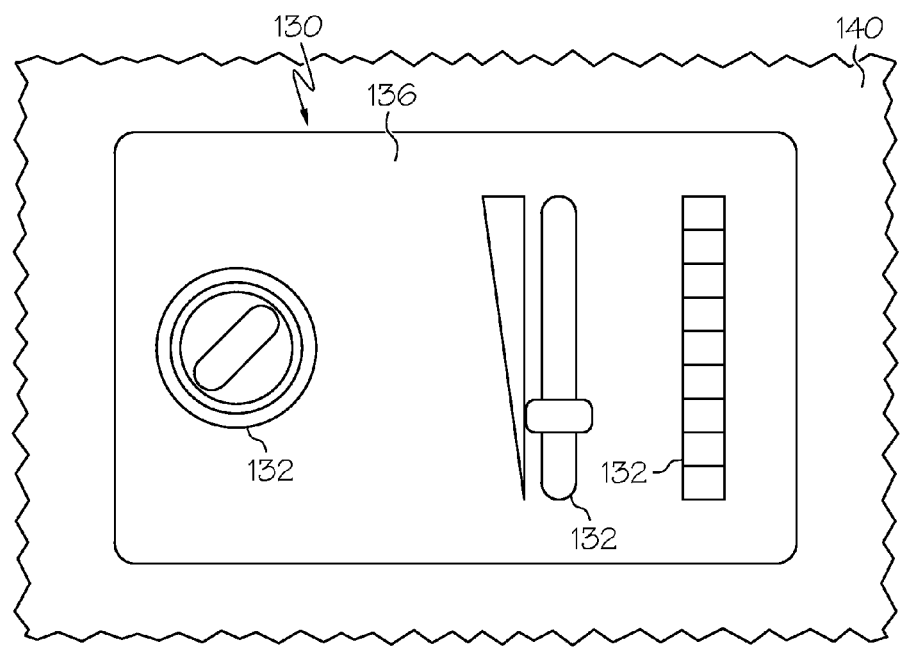
FIG. 7B depicts an HVAC control panel positioned in the receptacle shown in FIG. 7A such that the headliner of the vehicle is positioned between the HVAC control panel and the receptacle.

In the embodiment shown in FIG. 3, the control enclosure 138 has a rectangular, box-like configuration and the panel surface 136 has a similar rectangular configuration which overlaps and extends beyond the outer perimeter of the control enclosure 138 forming a lip 144 or flange which conceals the control enclosure 138 and receptacle 100 when the HVAC control panel 130 is positioned in the receptacle 100 (as shown in FIG. 7B). However, while the embodiments shown and described herein depict the control enclosure 138 and the panel surface 136 as comprising a substantially rectangular configuration, it should be understood that the control enclosure and the panel surface 136 may have other configurations including, without limitation, square, oval, elliptical and the like.

The HVAC control panel 130 may contain various HVAC controls 132 such as levers, knobs, buttons, switches and the like. The HVAC controls 132 may be used to control various aspects of a vehicle's HVAC system such as the temperature, fan speed, defroster, vent selection and the like. The user actuated portion of the controls (e.g., the levers, knobs, buttons, switches and the like) of the HVAC controls 132 may be positioned on the panel surface 136 while the various mechanical and electrical components of the HVAC controls 132 may be disposed in the control enclosure 138, as depicted in FIG. 5 where cross sections of various HVAC control components are shown in outline.

Still referring to FIG. 3, the control enclosure 138 may also comprise one or more standoff ribs 142. The standoff ribs 142 may be disposed on the control enclosure 138 and/or the panel surface 136. The standoff ribs 142 may be used to achieve the proper spacing between the panel surface 136 and the receptacle 100 when the HVAC control panel 130 is disposed in the receptacle 100. For example, in the embodiment shown in FIG. 3, the standoff ribs 142 are integrally formed with the control enclosure 138 and the panel surface 136 such that the standoff ribs 142 extend from the underside of the panel surface 136 and a side of the control enclosure 138. When the HVAC control panel 130 is installed in the receptacle 100, the standoff ribs contact the frame 102 of the receptacle 100 creating a gap or spacing between the panel surface 136 and the receptacle 100.

The control enclosure 138 may also comprise a chamfered exterior corner 146 which generally corresponds to the chamfered interior corner 108 of the receptacle 100, discussed above. The chamfered exterior corner 146 of the control enclosure 138 and the chamfered interior corner 108 of the receptacle 100 may be used in conjunction with one another to ensure that the HVAC control panel 130 is properly aligned and oriented with respect to the frame 102 of the receptacle 100 during installation.

The control enclosure 138 may also comprise one or more locking lugs 134. The locking lugs 134 are positioned on the control enclosure 138 such that, when the HVAC control panel 130 is positioned in the receptacle 100, the locking lugs 134 engage with the shoulders 120 of the unlocking levers 106. In the embodiment shown in FIG. 3, the locking lugs 134 are generally wedge-shaped features which extend from the control enclosure such that the widest portion of the locking lug is disposed proximate the panel surface 136 and the locking lugs 134 taper in a direction away from the panel surface 136.

In the embodiment shown in FIG. 3, the locking lugs 134 have a "U" configuration. However, it should be understood that the locking lugs 134 may also be substantially solid, such as when the locking lugs 134 are a solid wedge. Further, is should also be understood that the locking lugs may take on various other geometrical configurations. For example, in one embodiment (not shown), the locking lugs 134 may be substantially rectangular or square. In another embodiment (not shown) the locking lugs 134 may be substantially hemispherical. Accordingly, it will be understood that the locking lugs 134 may be of any suitable geometric configuration for engaging with the shoulders 120 of the unlocking levers 106 such that the HVAC control panel may be releasably retained in the receptacle 100.

Figure 4:
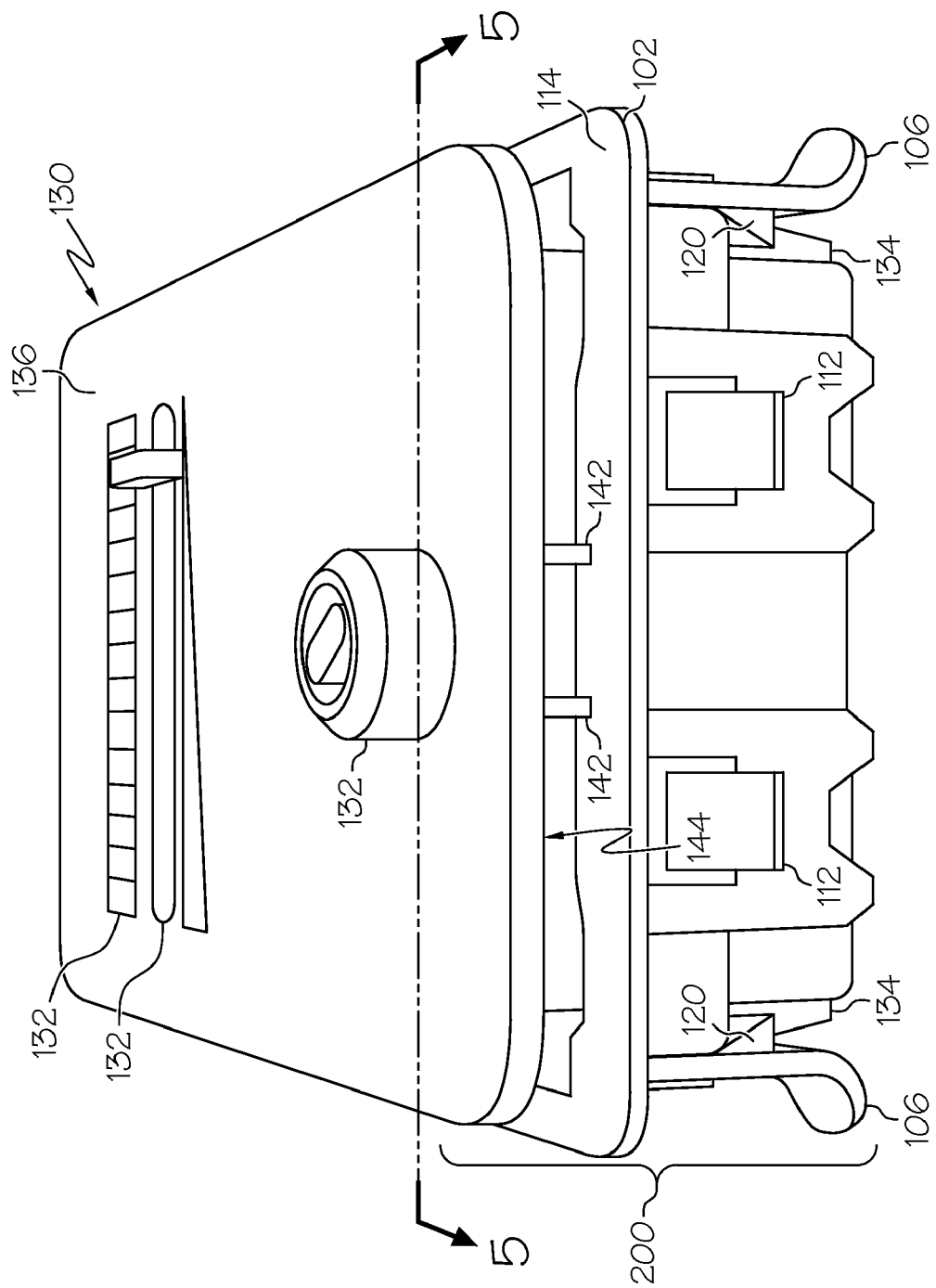
FIG. 4 depicts an HVAC panel assembly comprising the HVAC control panel of FIG. 3 disposed in the receptacle of FIGS. 1 and 2 according to one or more embodiments shown and described herein.

Referring now to FIG. 4, an HVAC panel assembly 200 is shown according to one embodiment described herein. The HVAC panel assembly 200 comprises the HVAC control panel 130 releasably retained in the receptacle 100. More specifically, the HVAC panel assembly is formed by inserting the HVAC control panel 130 in the receptacle 100 such that the locking lugs 134 located on the control enclosure 138 are engaged with the shoulders 120 of the unlocking levers 106. When the HVAC control panel 130 is positioned in the receptacle 100, the standoff ribs 142 located on the HVAC control panel 130 contact the flanged portion 114 of the frame 102 of the receptacle 100 thereby ensuring proper spacing between the HVAC control panel 130 and the receptacle 100.

Referring now to FIGS. 5A-5B, 6, 7A and 7B, the HVAC control panel 130 is shown being installed into a receptacle 100 positioned in a headliner 140 of a vehicle. The receptacle 100 is first positioned in the headliner 140 such that the frame 102, specifically the flanged portion 114 of the frame 102, is in direct contact with the underside of the headliner 140, as shown in FIG. 7A. The receptacle 100 is positioned in the headliner 140 such that the chamfered interior corner 108 of the receptacle is in the desired orientation, which, in turn, governs the orientation of the HVAC control panel 130 in the receptacle 100. The receptacle 100 is also positioned in the headliner 140 such that an opening 150 in the headliner 140 generally corresponds to the opening 104 in the receptacle 100. When the receptacle 100 is positioned in the headliner 140, the edge 148 of the headliner opening 150 overlaps the flanged portion 114 of the receptacle and extends into the opening 104 of the receptacle. In one embodiment, when the receptacle 100 is positioned in the headliner 140, the receptacle 100 is held in place with respect to the headliner 140 by inserting the HVAC control panel into the receptacle 100. In another embodiment, the receptacle 100 may be held in place with respect to the headliner using an adhesive applied between the flanged portion 114 and the headliner 140.

With the receptacle 100 positioned in the headliner 140, the HVAC control panel 130 may be inserted into the opening 104 in the receptacle 100. To insert the HVAC control panel 130 into the receptacle 100, the HVAC control panel 130 is first oriented such that the chamfered exterior corner of the HVAC control panel 130 is aligned with the chamfered interior corner 108 of the receptacle 100. In this orientation, the locking lugs 134 of the HVAC control panel 130 are also aligned with the U-shaped channels 126 of the receptacle. The HVAC control panel 130 may then be inserted into the receptacle 100 such that the headliner 140 is disposed between the flanged portion 114 of the receptacle 100 and the panel surface 136 of the HVAC control panel 130, as shown in FIGS. 5A and 5B.

Referring to FIG. 5A, as the HVAC control panel 130 is inserted into the receptacle 100, the locking lugs 134 located on the control enclosure 138 contact the shoulders 120 located on the unlocking levers 106 of the receptacle 100 causing the unlocking levers 106 to elastically bend or flex about the tapered portion 118 and displace outwardly, away from the opening 104 in the receptacle 100. The elastic bending or flexing of the unlocking levers 106 about the tapered portion 118 allows the locking lugs 134 to slide over the shoulders 120 at which point the unlocking levers 106 spring back to their initial position. When the unlocking levers 106 spring back to their initial position, the shoulders 120 engage with the locking lugs 134 thereby securing the HVAC control panel 130 in the receptacle 100, as shown in FIGS. 5B and 6. With the unlocking levers 106 and locking lugs 134 in this position, the HVAC control panel 130 cannot be withdrawn from the receptacle 100 without actuating the handle portion 122 of the unlocking levers 106 to disengage the shoulders 120 from the locking lugs 134 of the HVAC control panel 130.

FIG. 7B shows the HVAC control panel 130 positioned in the headliner 140 of a vehicle. When installed in the headliner 140, the panel surface 136 overlaps the receptacle 100 and the edge 148 of the opening 150 in the headliner 140 such that both are obscured from view.

Referring now to FIG. 5C, to remove the HVAC control panel 130 from the receptacle 100, the handle portions 122 of the unlocking levers 106 may be used to disengage the shoulders 120 of the unlocking levers 106 from the locking lugs 134 of the HVAC control panel 130. To access the unlocking levers 106 a portion of the headliner 140 surrounding the HVAC control panel 130 may be detached from the ceiling of the vehicle permitting a user to reach between the headliner and the ceiling of the vehicle and grasp the handle portion 122 of each unlocking lever 106. The unlocking levers 106 are then pulled in a direction away from the opening 104 (e.g., away from the locking lugs 134 of the HVAC control panel 130 as shown in FIG. 5C) thereby disengaging the shoulders 120 of the unlocking levers 106 from the locking lugs 134 of the HVAC control panel 130. With the shoulders 120 disengaged from the locking lugs 134, the HVAC control panel 130 may be removed from the receptacle 100 and the required maintenance and/or repair performed.

It should now be understood that the receptacle with unlocking levers shown and described herein may be used in conjunction with an HVAC control panel to form an HVAC control panel assembly which may be positioned in the headliner of a vehicle. Further, the unlocking levers of the receptacle facilitate retaining the HVAC control panel in the receptacle as well as providing a mechanism to release or remove the HVAC control panel from the receptacle without the use of a tool. Accordingly, the receptacle with unlocking levers described herein is an alternative device for retaining an HVAC control panel in a vehicle headliner which may reduce the maintenance time and costs for the vehicles in which the receptacle is installed.

For the purposes of describing and defining the present invention it is noted that the terms "substantially" and "about," when utilized herein, represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A receptacle for receiving an HVAC control panel of a vehicle, the receptacle comprising a frame and at least one unlocking lever, wherein:
    the frame defines an opening for receiving the HVAC control panel;
    the at least one unlocking lever comprises a handle portion, a shoulder and a tapered portion, wherein:
        the tapered portion pivotally connects the at least one unlocking lever to an underside of the frame;
        the handle portion extends from the tapered portion such that, when the handle portion is actuated, the at least one unlocking lever is elastically flexible with respect to the frame; and
        the shoulder is disposed on the at least one unlocking lever between the handle portion and the tapered portion and is operable to engage and retain the HVAC control panel in the frame when the HVAC control panel is inserted into the frame.

2. The receptacle of claim 1 wherein the frame comprises a sidewall and a flanged portion.

3. The receptacle of claim 2 wherein the sidewall and the flanged portion are substantially perpendicular to one another and the at least one unlocking lever extends from an underside of the flanged portion such that the handle portion extends beyond the sidewall.

4. The receptacle of claim 1 wherein the frame comprises a chamfered interior corner.

5. The receptacle of claim 1 wherein the frame comprises at least one harness connector.

6. The receptacle of claim 1 wherein the handle portion is curved away from the opening defined by the frame.

7. The receptacle of claim 6 wherein the shoulder of the at least one unlocking lever is substantially wedge-shaped.

8. The receptacle of claim 1 wherein the at least one unlocking lever is offset from the opening.

9. An HVAC control panel assembly for a headliner of a vehicle, the HVAC control panel assembly comprising a receptacle and an HVAC control panel removably inserted in the receptacle, wherein:
    the receptacle comprises a frame for receiving the HVAC control panel and at least one unlocking lever flexibly connected to an underside of the frame, the at least one unlocking lever comprising a handle portion extending from a tapered portion which pivotally connects the at least one unlocking lever to an underside of the frame, and a shoulder disposed on the at least one unlocking lever between the handle portion and the tapered portion, the shoulder portion for releasably engaging the HVAC control panel in the frame, wherein actuation of the handle portion elastically flexes the unlocking lever with respect to the frame and disengages the HVAC control panel from the receptacle; and
    the HVAC control panel comprises a control enclosure, a panel surface positioned on the control enclosure and at least one locking lug disposed on the control enclosure, wherein, when the HVAC control panel is inserted in the receptacle, the at least one locking lug is engaged with the shoulder of the at least one unlocking lever.

10. The HVAC control panel assembly of claim 9 wherein the at least one unlocking lever comprises a tapered portion disposed between the handle portion and the frame.

11. The HVAC control panel assembly of claim 9 wherein the HVAC control panel comprises at least one standoff rib, wherein, when the HVAC control panel is positioned in the receptacle, the at least one standoff rib spaces the panel surface from the frame.

12. The HVAC control panel assembly of claim 9 wherein the frame comprises a chamfered interior corner and the control enclosure comprises a corresponding chamfered exterior corner for orienting the HVAC control panel in the receptacle.

13. The HVAC control panel assembly of claim 9 wherein the frame comprises a sidewall and a flanged portion.

14. The HVAC control panel assembly of claim 13 wherein the sidewall and the flanged portion are substantially perpendicular to one another and the at least one unlocking lever extends from an underside of the flanged portion such that the handle portion extends beyond the sidewall.

15. The HVAC control panel assembly of claim 9 wherein the at least one unlocking lever is curved away from the HVAC control panel.

16. A vehicle comprising a headliner with an HVAC control panel assembly disposed in the headliner, the HVAC control panel assembly comprising a receptacle and an HVAC control panel removably inserted in the receptacle, wherein:

the receptacle is positioned in an opening in the headliner and comprises a frame for receiving the HVAC control panel and at least one unlocking lever comprising a handle portion extending from a tapered portion and a shoulder for releasably engaging the HVAC control panel in the frame, wherein the frame comprises a chamfered interior corner and the unlocking lever is flexibly connected to the underside of the frame at the tapered portion such that actuation of the handle portion elastically flexes the unlocking lever with respect to the frame and disengages the HVAC control panel from the receptacle; and the HVAC control panel comprises a control enclosure comprising a chamfered exterior corner corresponding to the chamfered corner of the frame for orienting the HVAC control panel in the receptacle, a panel surface positioned on the control enclosure and at least one locking lug disposed on the control enclosure, wherein, when the HVAC control panel is inserted in the receptacle, the headliner is disposed between the HVAC control panel and the receptacle and the at least one locking lug is engaged with the shoulder of the at least one unlocking lever.

17. The vehicle of claim 16 wherein the HVAC control panel comprises at least one standoff rib, wherein, when the HVAC control panel is positioned in the receptacle, the at least one standoff rib spaces the panel surface from the frame.

18. The vehicle of claim 16 wherein the frame comprises a sidewall and a flanged portion oriented substantially perpendicular to one another and the at least one unlocking lever extends from an underside of the flanged portion such that the handle portion extends passed the sidewall.

19. The vehicle of claim 16 wherein the at least one unlocking lever is curved away from the HVAC control panel.

20. The vehicle of claim 16 wherein the shoulder portion of the at least one unlocking lever is disposed between the handle portion and the tapered portion of the at least one unlocking lever.

* * * * *